United States Patent
Tanaka et al.

(10) Patent No.: US 6,769,045 B2
(45) Date of Patent: *Jul. 27, 2004

(54) PCI EXPANSION ADAPTER WITH PC CARD SLOT AND ELECTRONIC APPARATUS PROVIDED WITH THE SAME

(75) Inventors: Mikihiro Tanaka, Hadano (JP); Kenichi Yoshida, Ebina (JP); Hiroyuki Inokuchi, Hadano (JP); Takashi Maruyama, Ebina (JP); Kazuma Kishi, Ebina (JP); Hironori Oikawa, Hadano (JP); Hiroshi Ito, Atsugi (JP); Hitoshi Yokota, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 402 days.

This patent is subject to a terminal disclaimer.

(21) Appl. No.: 09/949,823

(22) Filed: Sep. 12, 2001

(65) Prior Publication Data

US 2002/0065970 A1 May 30, 2002

Related U.S. Application Data

(63) Continuation of application No. 09/950,356, filed on Sep. 11, 2001, now Pat. No. 6,527,562.

(30) Foreign Application Priority Data

Nov. 30, 2000 (JP) .................................... 2000-369609
Jul. 27, 2001 (JP) .................................... 2001-226986

(51) Int. Cl.[7] ........................ G06F 13/00; H01R 12/00; H05K 7/14

(52) U.S. Cl. ........................ 710/301; 710/300; 439/65; 361/796

(58) Field of Search .................................. 710/300, 301; 361/796, 797, 724, 730, 752, 753; 439/61, 65

(56) References Cited

U.S. PATENT DOCUMENTS

| 5,305,182 A | * | 4/1994 | Chen ........................... 361/684 |
| 5,594,621 A | * | 1/1997 | van Rumpt ................. 361/686 |
| 5,709,568 A | * | 1/1998 | Pan et al. ................ 439/541.5 |
| 6,046,912 A | * | 4/2000 | Leman ........................ 361/784 |
| 6,261,104 B1 | * | 7/2001 | Leman ......................... 439/61 |
| 6,599,134 B1 | * | 7/2003 | Duarte et al. ................. 439/61 |

FOREIGN PATENT DOCUMENTS

JP 2000/010912 1/2000

\* cited by examiner

*Primary Examiner*—Sumati Lefkowitz
*Assistant Examiner*—Trisha Vu
(74) *Attorney, Agent, or Firm*—Mattingly, Stanger & Malur, P.C.

(57) ABSTRACT

There is provided a technology for realizing an PCI expansion adapter for a PC card which is connectable to a desktop type personal computer PCI expansion connector using a low profile PCI. The PCI expansion adapter includes an expansion unit which is provided with an electrical connector to a PCI bus, a low profile PCI expansion board provided with a PC card control element and an electrical connector to the PC card, wherein the low profile PCI expansion board and the expansion unit are connected by the electrical connectors mounted on the respective boards.

18 Claims, 17 Drawing Sheets

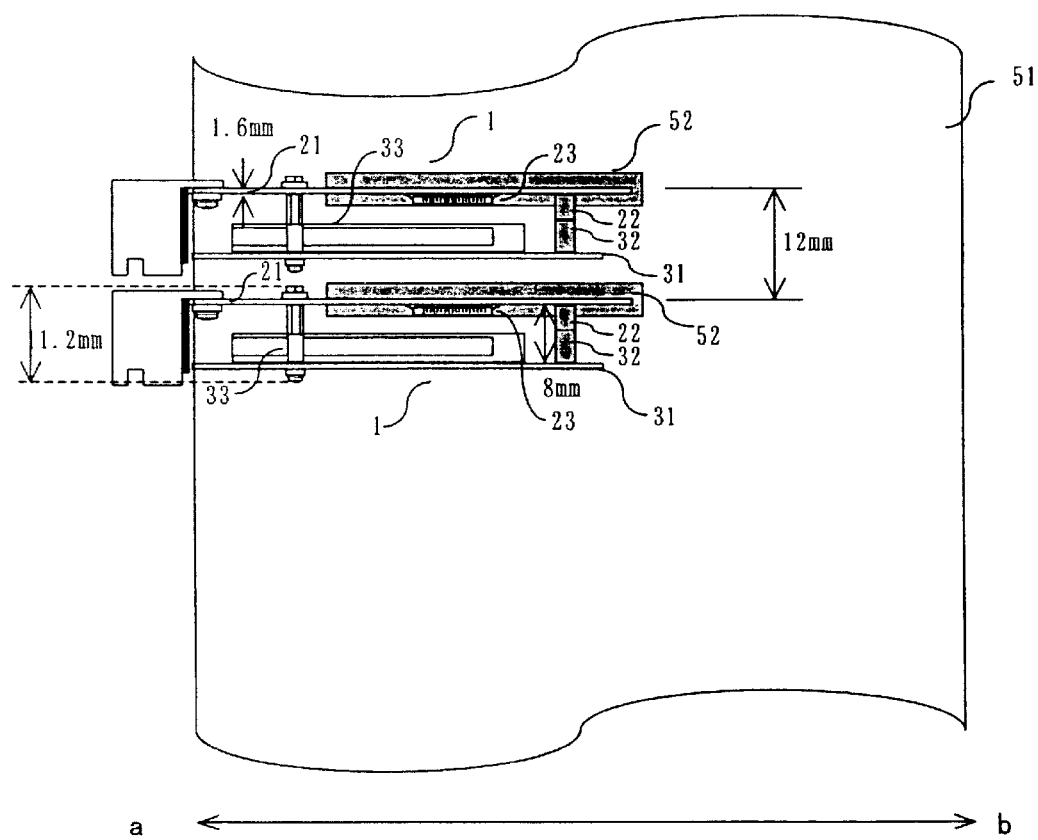

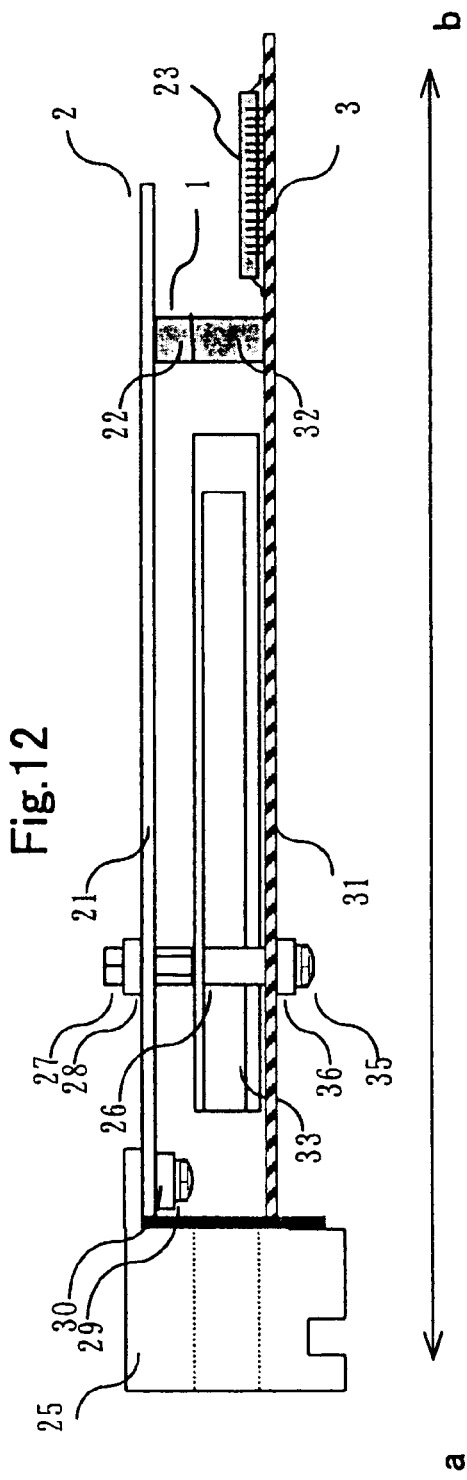

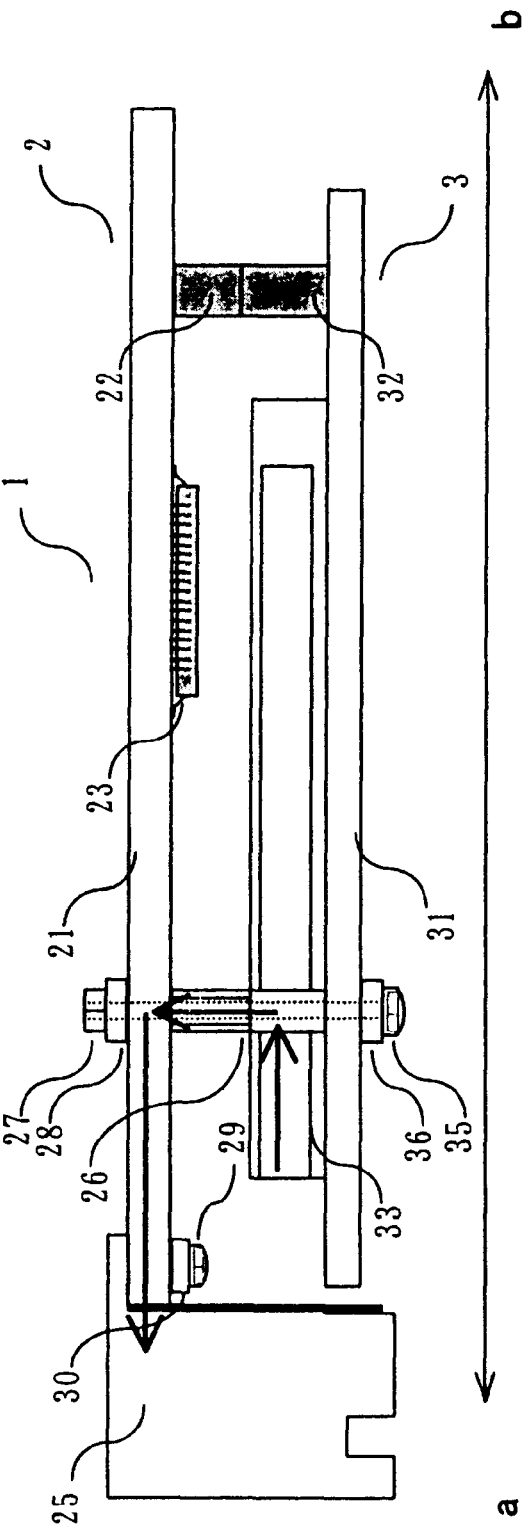

PRIOR ART

PCI EXPANSION ADAPTER WITH PC CARD SLOT AND ELECTRONIC APPARATUS PROVIDED WITH THE SAME

This is a continuation application of U.S. Ser. No. 09/950,356, filed Sep. 11, 2001, now U.S. Pat. No. 6,527,562.

BACKGROUND OF THE INVENTION

The present invention relates to an electronic apparatus provided with a low profile PCI slot and a PCI expansion adapter connected to the electronic apparatus.

Conventionally, in order to use a PC card for a notebook personal computer in a desktop type personal computer, there is used a PCI expansion card provided with a connector for connecting a PC card and a control LSI for controlling the connection with PCI (Peripheral Component Interconnect) bus.

On the other hand, in accordance with the recent miniaturization of a personal computer or the like, a low profile PCI expansion board, which is smaller than a conventional PCI expansion card, is standardized for an electronic apparatus such as a desktop type personal computer and a printer by the PCI Special Interest Group. The details thereof are described in the PCI Local Bus Specification Ver. 2.2 and the ECN referring to the Low Profile PCI Card.

As shown in FIG. 14, the low profile PCI expansion board is a card edge type board having a connection terminal 63 in a part of its one edge. The name "low profile" derives from its low profile in the height direction (the ac direction in FIG. 14) from the motherboard. The low profile PCI expansion board is mounted on the motherboard by inserting the connection terminal 63 into a PCI expansion connector 52 on the motherboard.

The PC card is inserted or removed through an expansion slot provided on the cabinet of an electronic apparatus such as a desktop type personal computer, while the mounting direction of the expansion slot may be limited to the ab direction shown in FIG. 14 due to the positional relationship between the cabinet of the electronic apparatus and a motherboard therein.

BRIEF SUMMARY OF THE INVENTION

A parts mountable area on the low profile PCI expansion board 61 has a length of 56.15 mm in the ac direction except the connection terminal section 63. Further, the minimum horizontal width of a commercially available PC card slot 62 is approximately 62 mm (for example, the model JC21EJ-FSN20 manufactured by Japan Aviation Electronics Industry, Limited). Thus, it has been impossible to mount the PC card slot 62 so that the card insertion/removal direction corresponds to the ab direction as the case of a conventional PCI expansion card. In addition, because of restriction under the standard, it has been also impossible to employ the structure in which the PC card insertion/removal direction is perpendicular to the parts mounting surface (the abc surface) of the low profile PCI expansion board 61.

Also, the horizontal width of the PC card is regulated to be 54 mm in the Physical Specification (P.31) for the PC Card Standard. Thus, it is difficult to develop a PC card slot mountable on the low profile PCI expansion board. Further, since a bracket position for the PCI expansion card is also regulated, it is impossible to mount the PC card slot in the ac direction in which the PC card is inserted or removed. Thus, it is difficult to use a PC card on an electronic apparatus employing a low profile PCI.

It is a main object of the present invention to provide a technology to allow an electronic apparatus employing a low profile PCI to mount a PC card thereon while using a conventional PC card slot.

An electronic apparatus of the present invention comprises: a first board provided with an expansion connector for connecting with a bus; a second PCI-compliant low profile board provided with a connection terminal to be inserted into the expansion connector; an expansion unit provided with a PC card slot for mounting a PC card thereon; and a cabinet provided with a PC card insertion/removal opening, wherein the expansion unit is placed in parallel to the second board, and the PC card insertion/removal opening is placed in parallel to the PC card slot.

The expansion unit of the electronic apparatus of the present invention may comprise a third board on which the PC card slot is mounted.

Further, the expansion unit of the electronic apparatus of the present invention may have the height, from the first board, lower than that of the second board.

Furthermore, the electronic apparatus of the present invention may have a space between the expansion unit and the connection terminal on the second board so that the second board can be inserted into the expansion connector.

The other objects, features and advantages of the present invention will be apparent from the drawings and following explanations.

BRIEF DESCRIPTION OF THE SEVERAL VIEWS OF THE DRAWINGS

FIG. 10 is a view of an embodiment where the PCI expansion adapter of the present invention is inserted into the PCI expansion connector of the desktop type personal computer viewed from right above the motherboard;

FIG. 12 is a side view of another embodiment of the PCI expansion adapter of the present invention;

FIG. 13 illustrates an embodiment where static electricity is removed from the expansion unit;

DETAILED DESCRIPTION OF THE INVENTION

Figure 1:
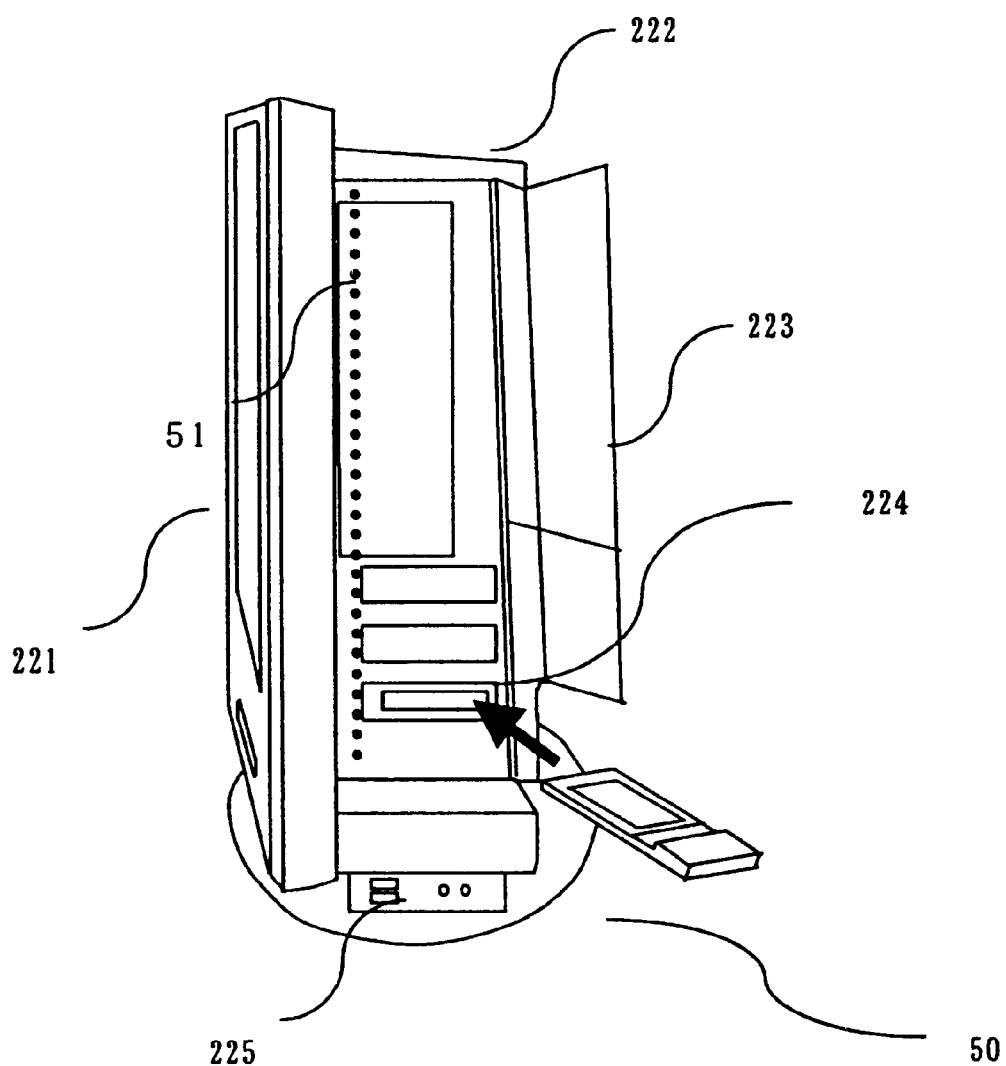
FIG. 1 is an external view of a desktop type personal computer on which a PCI expansion adapter of the present invention is mounted.

With reference to the attached drawings, embodiments of the present invention will be explained in detail below. In the drawings, an insertion/removal direction of the PC card with respect to the PCI expansion adapter of the present invention corresponds to the ab direction, and an insertion/removal direction of the PCI expansion adapter with respect to the PCI expansion connector on the motherboard corresponds to the ac direction.

First, the PCI expansion adapter of this embodiment will be explained by using FIG. 1 to FIG. 10.

FIG. 1 is an external view of an information processing apparatus incorporating the PCI expansion adapter 1 of the present invention. In this embodiment, the information processing apparatus 50 is a display-integrated personal computer. The information processing apparatus 50 is provided with a display part 221, a main unit cabinet 222 which includes a motherboard 51, and a protection cover 223.

Furthermore, a work plane is provided on the right side of the information processing apparatus in the main unit cabinet 222, when viewed from the front (display), and the work plane is provided with a plurality of PC card insertion/removal openings 224 and various connectors 225. A PC card inserted from the PC card insertion/removal opening 224 is inserted into a PC card slot 33 of the PCI expansion adapter 1 so as to be electrically connected to the PCI expansion adapter 1.

The main unit cabinet 222 houses the motherboard 51 to which the PCI expansion adapter 1 is mounted. Here, the "motherboard" refers to the board as a main part of the information processing apparatus, on which a CPU, a main memory, and various boards such as a daughter board and an expansion board are mounted and mutually connected, and which board further includes various buses such as a local bus and a PCI bus contains for transmitting data signals.

Figure 17:
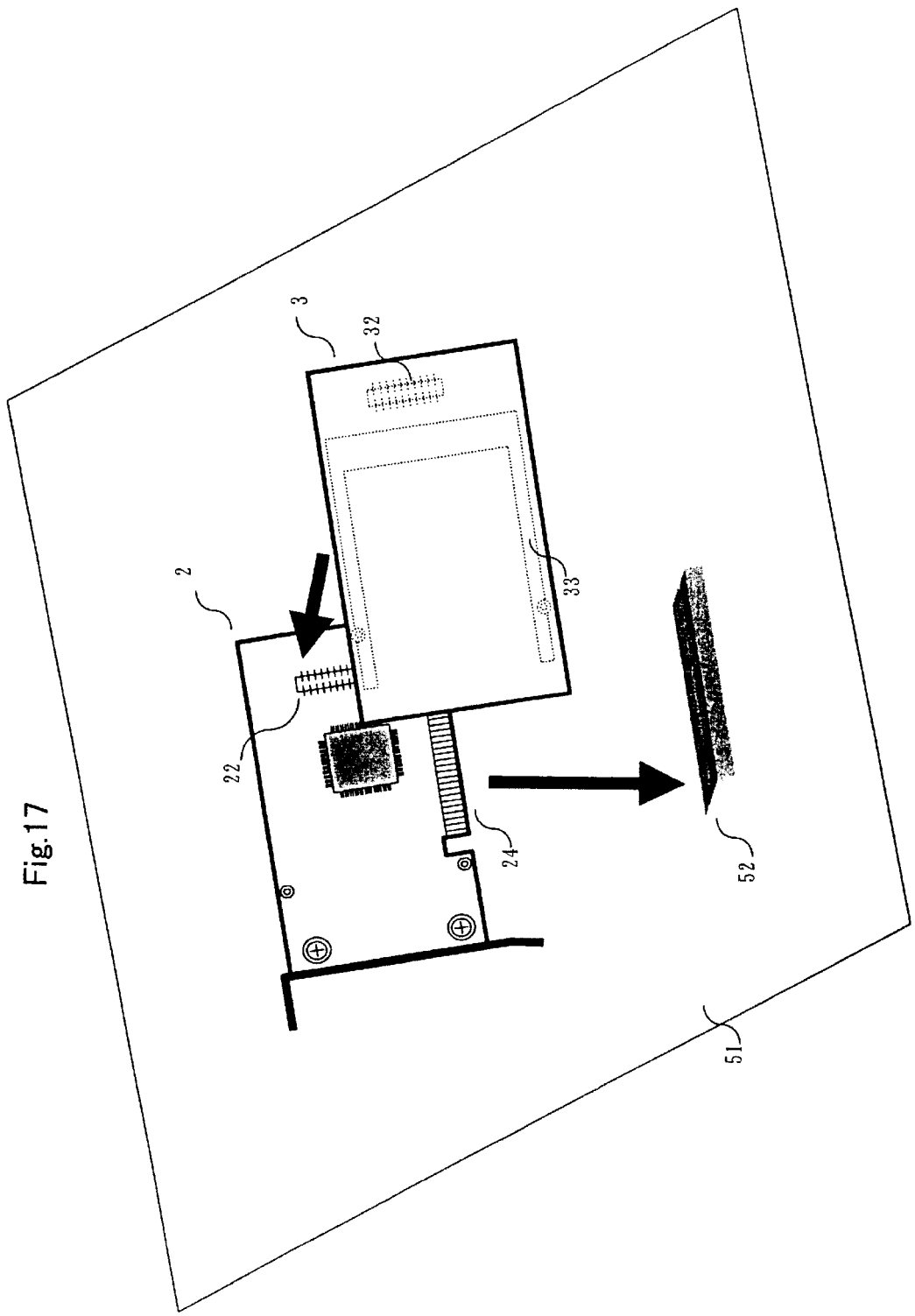
FIG. 17 illustrates an example of mounting the PCI expansion adapter provided with the PC card slot onto the motherboard.

FIG. 17 shows how the PCI expansion adapter 1 is mounted on the motherboard 51. The motherboard is provided with a PCI expansion connector 52. As will be explained later, the PCI expansion adapter includes a board 2 which can be inserted to and removed from the PCI expansion connector 52, and an expansion unit 3 provided with a PC card slot 33 which is the electrical connection means with a PC card, which boards are mutually and electrically connected via stacking connectors 22 and 32 provided on the respective boards.

As shown with a dotted line in FIG. 1, the motherboard 51 is set on the display side as the front of the cabinet interior and the PCI expansion adapter 1 is mounted on the surface of the motherboard 51 opposite to the surface facing the display.

Figure 2:
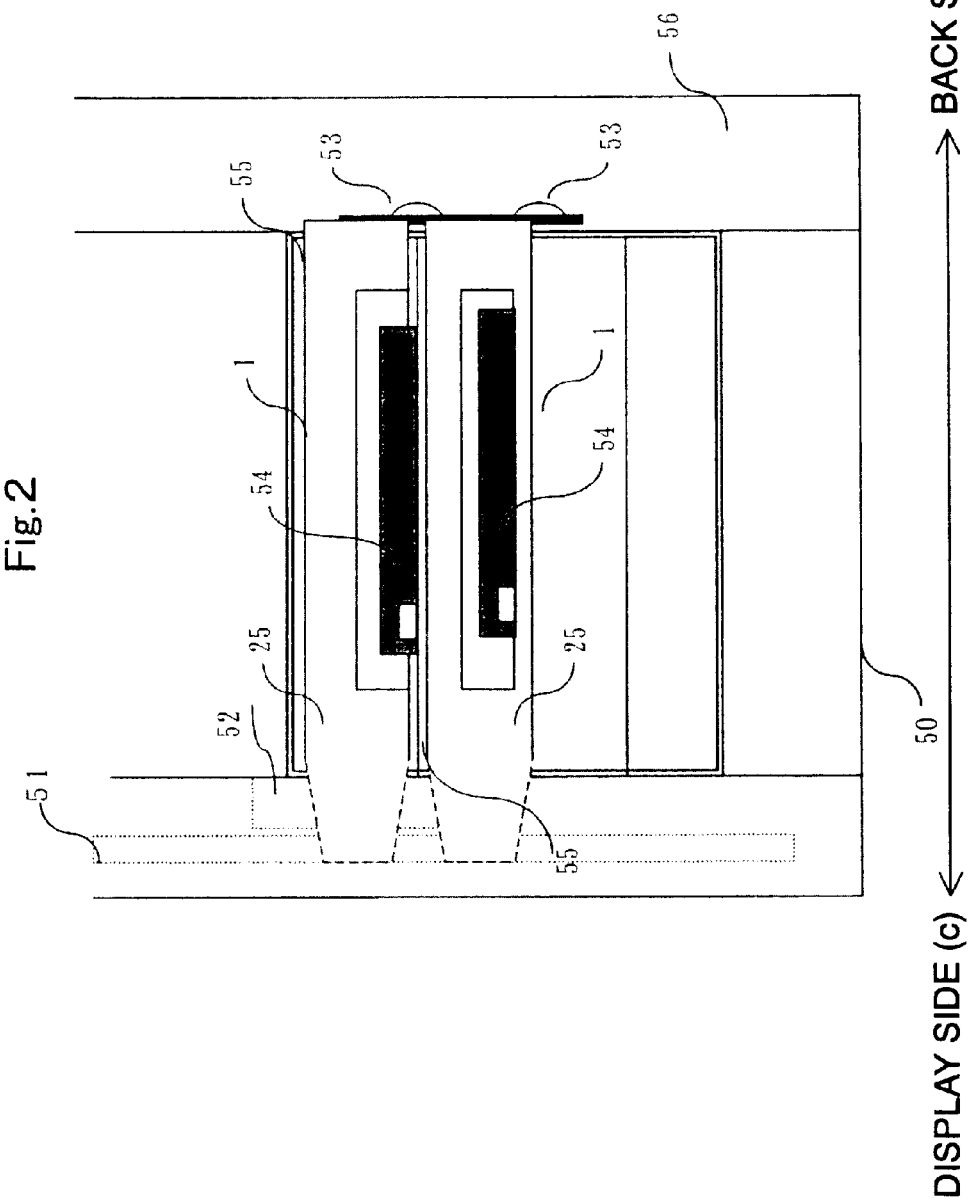
FIG. 2 is a view of the PCI expansion adapter of the present invention when viewed from an expansion slot insertion/removal opening of an embodiment in which the PCI expansion adapter is mounted on the desktop type personal computer.
Figure 3:
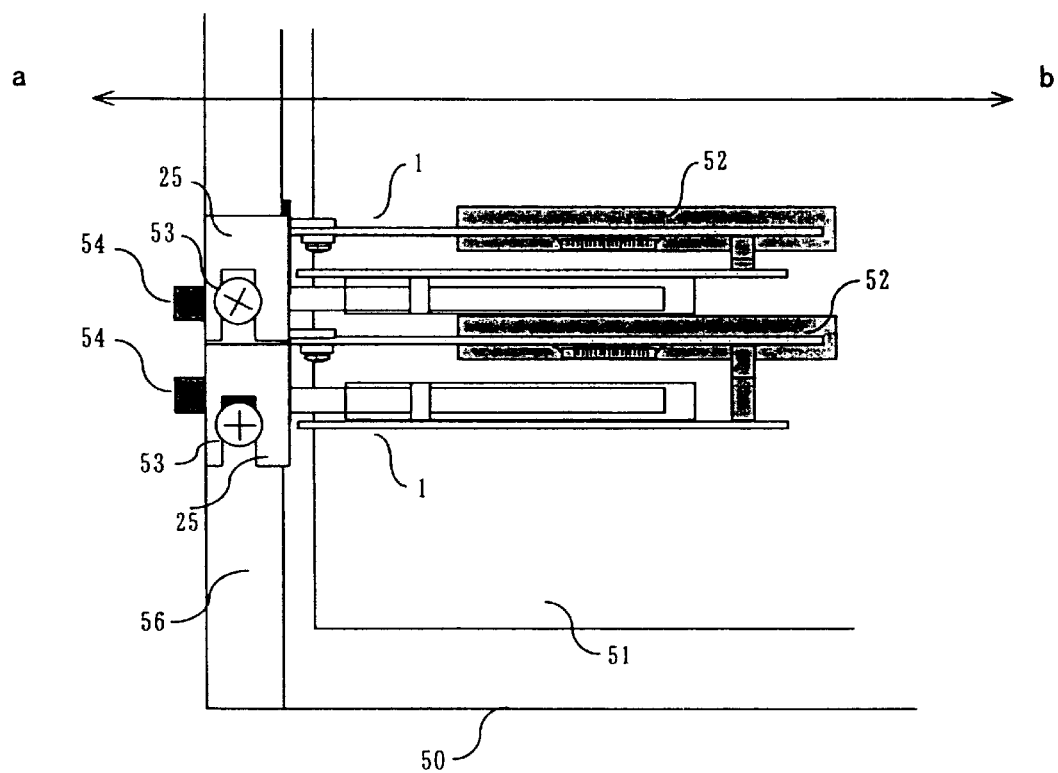
FIG. 3 is a side view of an embodiment of the PCI expansion adapter of the present invention mounted on the desktop type personal computer with a cabinet cover removed.
Figure 4:
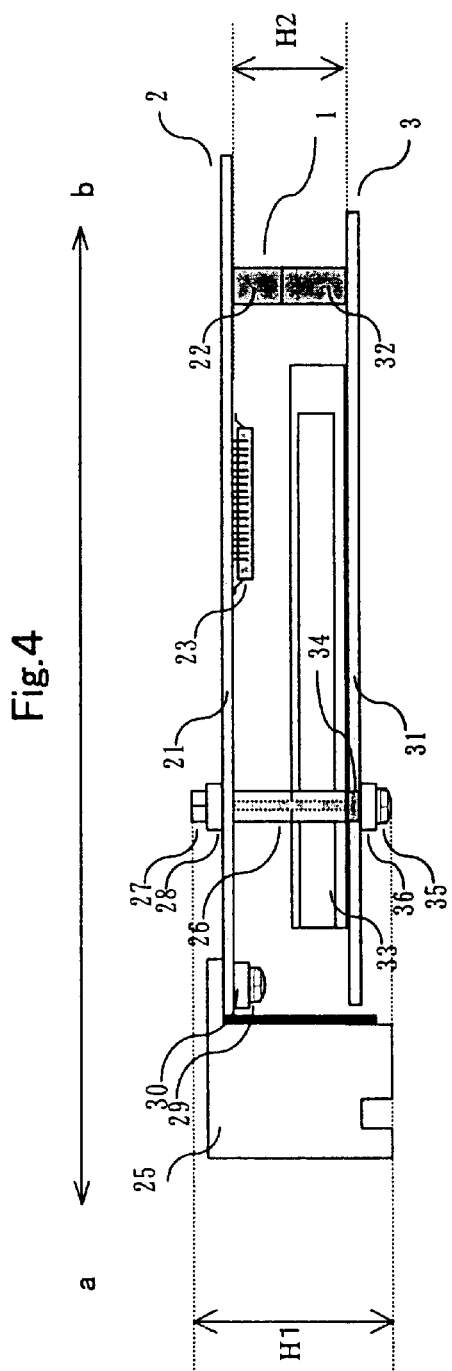
FIG. 4 is a side view of an embodiment of the PCI expansion adapter of the present invention.

Then, the structure for fixing the PCI expansion slot 1 to the information processing apparatus 50 will be explained by using FIG. 2 and FIG. 3. FIG. 2 is an enlarged view of the expansion slot 55 on the work plane of the main unit cabinet 222 viewed from the insertion/removal opening side. FIG. 3 shows the motherboard 51 with a part of the cabinet cover 56 of the desktop type personal computer 50 removed, viewed from the back of the information processing apparatus 50.

The PCI expansion adapter 1 is fastened to a bracket 25 via a screw 29 and a washer 30. The bracket 25 is a structural material to fix the PCI expansion adapter 1 to the main unit cabinet 222 and fixed to the cabinet cover 56 via a screw 53. The PCI expansion adapter 1 is fixed to the cabinet via the bracket 25 and also inserted into the PCI expansion connector 52 which is mounted on the motherboard 51.

The expansion slot 55 is formed on the main unit cabinet 222 for the insertion of the PC card 54, and the PC card 54 is inserted from the expansion slot 55 into the PC card slot 33 of the PCI expansion adapter 1.

Then, the structure of the PCI expansion adapter 1 of the present invention will be explained using FIG. 4 to FIG. 7. The PCI expansion adapter 1 is constructed from the board 2 to be inserted into and removed from the PCI expansion connector 52 on the motherboard of the information processing apparatus, and the expansion unit 3 provided with the PC card slot 33 which is the means for electrical connection with the PC card, while both boards are mutually and electrically connected via the stacking connectors 22 and 32 on the respective boards.

The board 2 is a PCI expansion card compliant with the low profile PCI standard and connected with the PCI bus on the motherboard, which board will be referred to as a "low profile PCI expansion board". The expansion unit 3 includes the PC card slot 33 to install a PC card thereto and is used to transmit and receive data signals between the PC card and a CPU or the like. The board 2 and expansion unit 3 are also fixed via supporting members such as a screw 35, which will be described later.

Furthermore, although this embodiment describes the case of the expansion unit 3 mounting a PC card thereon, the expansion unit 3 may carry an IC card reader/writer which writes and reads data to and from an IC card, for example, used for personal authentication, other than the PC card slot 33. Furthermore, anything other than the PC card slot or IC card reader/writer can also be mounted, if the configuration of the present invention is valid because it is not possible to mount the PC card on the existing low profile PCI board.

The low profile PCI expansion board 2 and expansion unit 3 are fixed using the bracket 25, screw 29 and washer 30 as shown in FIG. 2 and FIG. 3. These are connected via the stacking connectors 22 and 32 and are also mutually fixed via support members such as a spacer 26, screw 35, nut 27, washers 28 and 36.

Figure 6:
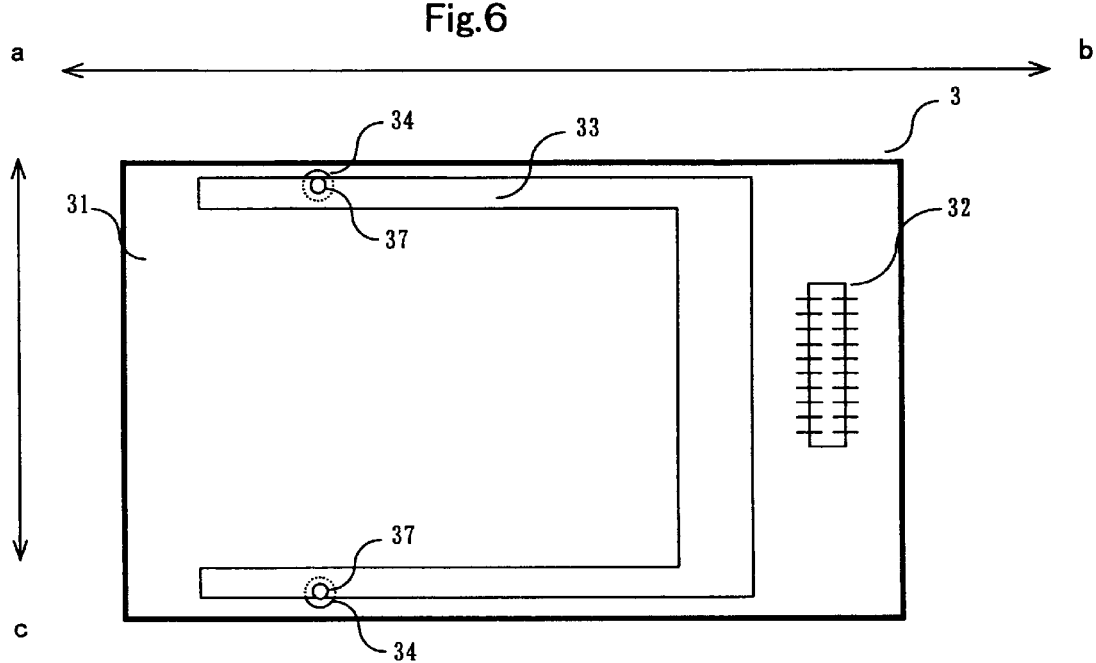
FIG. 6 is an embodiment of the expansion unit constituting the PCI expansion adapter of the present invention.

The support structure of the low profile PCI expansion board 2 and expansion unit 3 will be explained below. On the board 31, a drill hole 34 is provided directly beneath a board fixing screw hole 37 of the PC card slot. FIG. 6 shows a positional relationship between the board fixing screw 37 and the drill hole 34. The spacer 26 is fixed to the board 21 via the nut 27 and washer 28. When the stacking connectors 22 and 32 are engaged, the spacer 26 contacts the board fixing screw hole 37 of the PC card slot and maintains the distance between the low profile PCI expansion board 2 and expansion unit 3. Furthermore, the screw 35 is passed through the washer 36, drill hole 34 and board fixing screw hole 37, and screwed into the spacer 26, so that the board 31 and the spacer 26 are fixed.

The above-described configuration allows the low profile PCI expansion board 2 and expansion unit 3 to be mechanically fixed and can reduce the stress generated on the stacking connectors 22 and 32 when the PC card is inserted or removed. This method is also effective for mechanically fixing the low profile PCI expansion board 2 and expansion unit 3 when using other connecting means such as a cable or flat cable, which has difficulty in supporting those, instead of the stacking connectors 22 and 32.

Figure 5:
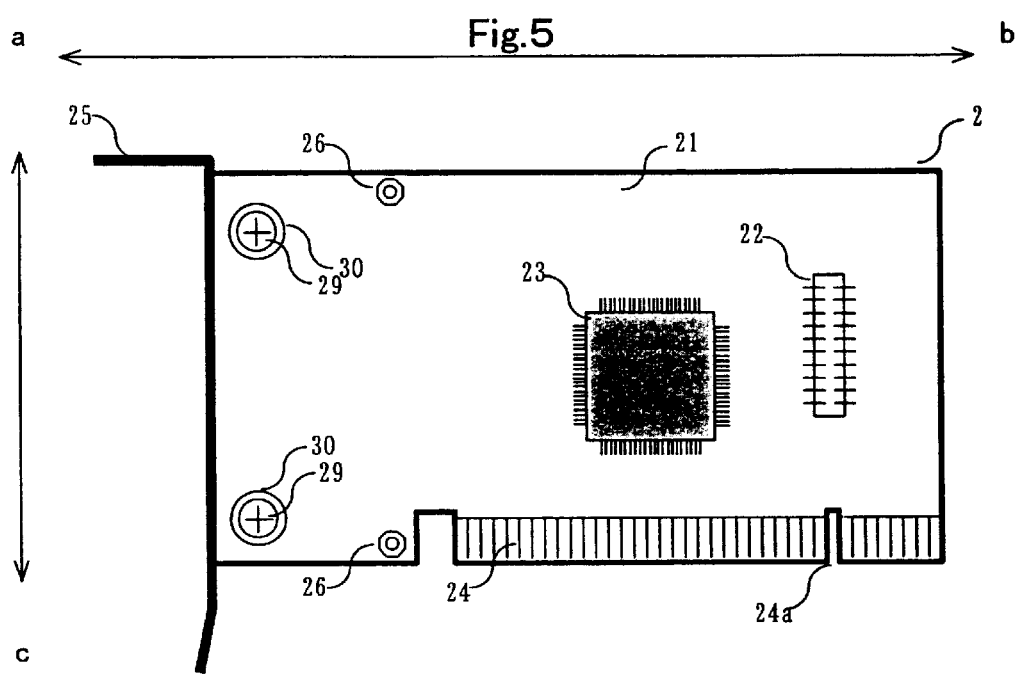
FIG. 5 is an embodiment of a low profile PCI expansion board constituting the PCI expansion adapter of the present invention.

FIG. 5 is a front view of the low profile PCI expansion board 2. There are two types of low profile PCI expansion board 2, namely for 5 V and 3.3 V, which are different in position of the key slot 24a of the connection terminal 24. The positions of the key slot 24a correspond to the PCI expansion connectors 52 for 3.3 V and 5 V on the motherboard respectively, and are intended to prevent wrong insertion into the different type of PCI expansion connector. The example in FIG. 5 shows a low profile PCI expansion board for 5 V, however the present invention is applicable to any card as long as satisfying the low profile PCI expansion board standard, and not limited to the 5 V card.

In the low profile PCI expansion board 2 in FIG. 5, the surface where the key slot 24a of the connection terminal for the 5 V PCI expansion card is provided at the right end is called as "parts mounting surface" ("primary side" or "component side B"), and the opposite surface is called as "back surface" ("secondary side" or "component side A"). In this embodiment, the parts mounting surface faces the expansion unit 3, and FIG. 5 shows the parts mounting surface.

The parts mounting surface of the low profile PCI expansion card 2 is provided with a PC card control LSI 23 which controls the input/output of data between the PCI bus and PC card. It is also provided with the stacking connector 22 to transmit various signals with the expansion unit 3. The stacking connector 22 may also be any other electrically connecting means such as a cable, electric wire or flexible board.

In this embodiment, the PC card control LSI 23 is mounted on the same side of the board 21 as the side on which the stacking connector 22 is installed, that is, the side facing the expansion unit 3. Not only the PC card control LSI 23 but also other mounting parts (not shown) other than the spacer 26, nut 27, washers 28 and 30, screw 29 are mounted on the side on which the stacking connector 22 of the board 21 is installed. By such the one-side mounting, it becomes possible to make the PCI expansion adapter thinner, and to reduce the number of man-hours for mounting parts.

FIG. 6 is a front view of the surface of the expansion unit 3 facing the low profile PCI expansion board. The expansion unit 3 of this embodiment is provided with the board 31, and the PC card slot 33 explained below. Furthermore, the stacking connector 32 for transferring signals to/from the low profile PCI expansion board 2 is also installed on the expansion unit 3. The stacking connector 32 is engaged with the stacking connector 22 installed on the low profile PCI expansion board 2 to electrically connect the low profile PCI expansion board 2 and expansion unit 3. The stacking connector 32 may also be any other electrically connecting means such as a cable, electric wire and flexible board, as same with the case of the stacking connector 22.

Figure 7:
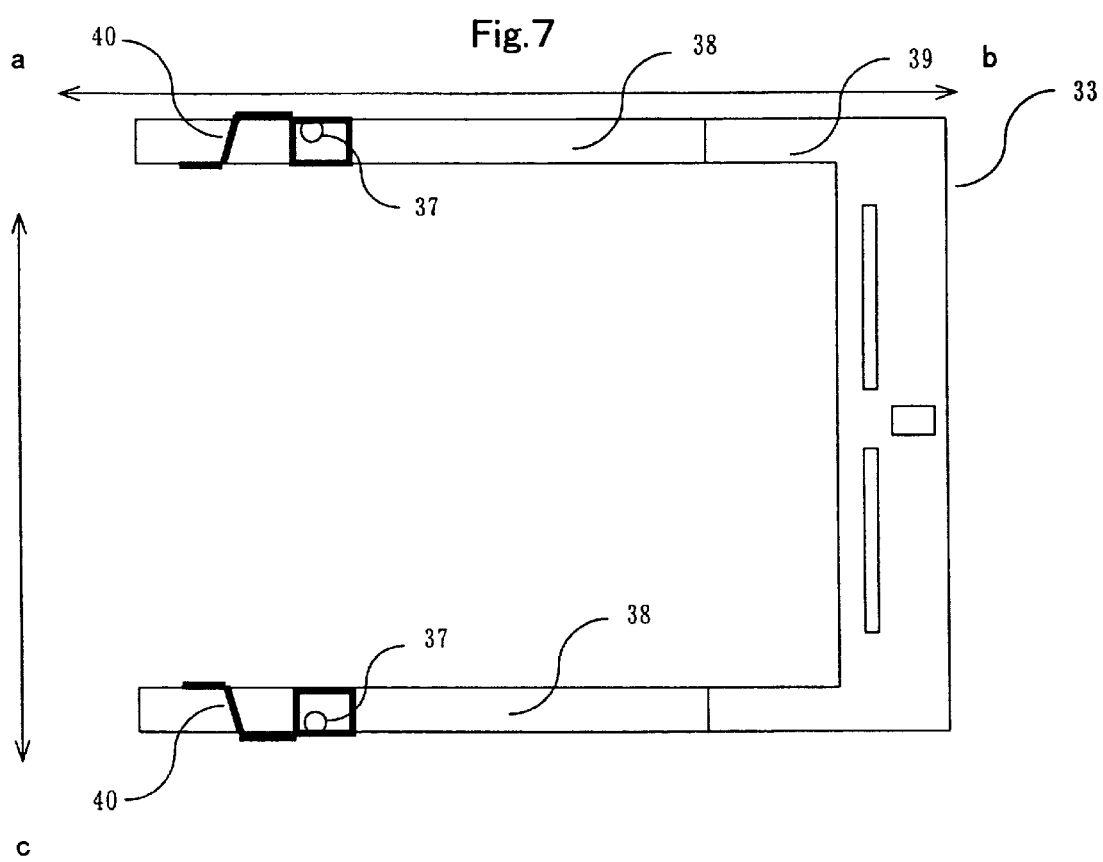
FIG. 7 is an embodiment of a PC card slot 33, which is an embodiment of the structure which dissipates the static electricity from the PCI expansion adapter.

FIG. 7 illustrates an example of the PC card slot 33. The PC card slot 33 in FIG. 7 is constructed from a board fixing screw hole 37, a PC card guide 38, a connector 39 and a metal part 40. The PC card slot 33 is not limited to a commercially available PC card slot, but may be any product having electrically connecting means with a device having a PCI bus interface.

Returning to FIG. 6, the expansion unit 3 of this embodiment has the PC card slot 33 on the surface on which the stacking connector 32 of the board 31 is mounted. That is, the expansion unit 3 mounts the PC card slot 33 on the surface facing the low profile PCI expansion board 2. On the surface on which the stacking connector 32 of the board 31 is mounted, the PC card slot 33, and mounting parts other than the screw 35 and washer 36 for supporting the expansion unit 3 are mounted. Thus, the one-side mounting is also applied to the expansion unit 3. The above-described configuration can make the PCI expansion adapter thinner, and also reduce the number of man-hours required for parts mounting.

Figure 8:
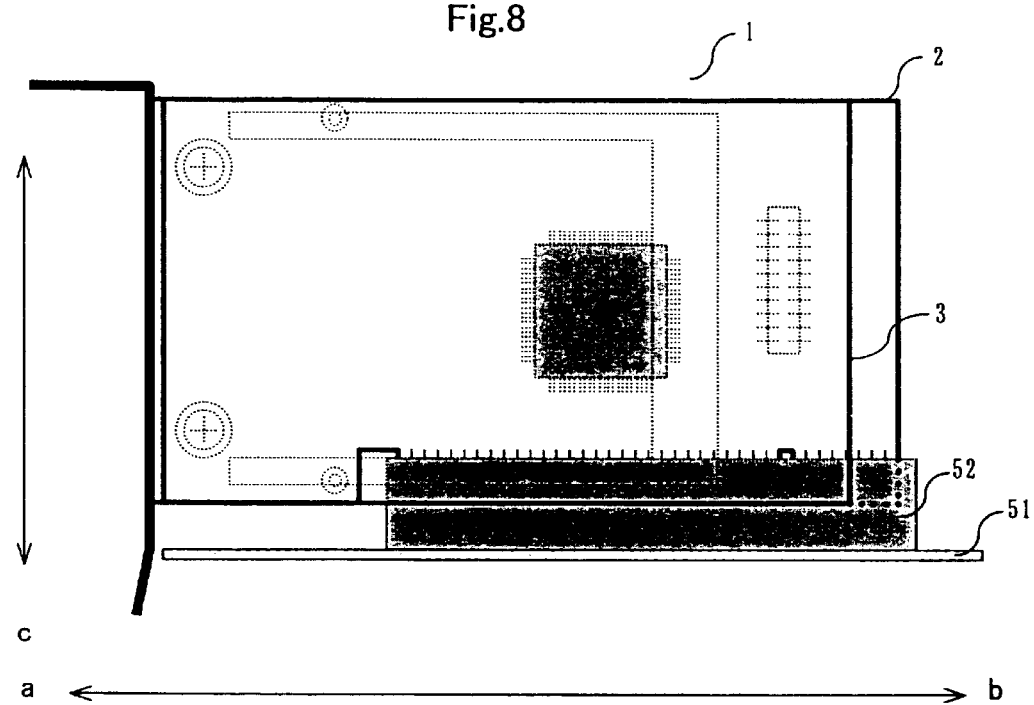
FIG. 8 is a view from the direction parallel to a motherboard of an embodiment where the PCI expansion adapter of the present invention is inserted into the PCI expansion connector of the desktop type personal computer.
Figure 9:
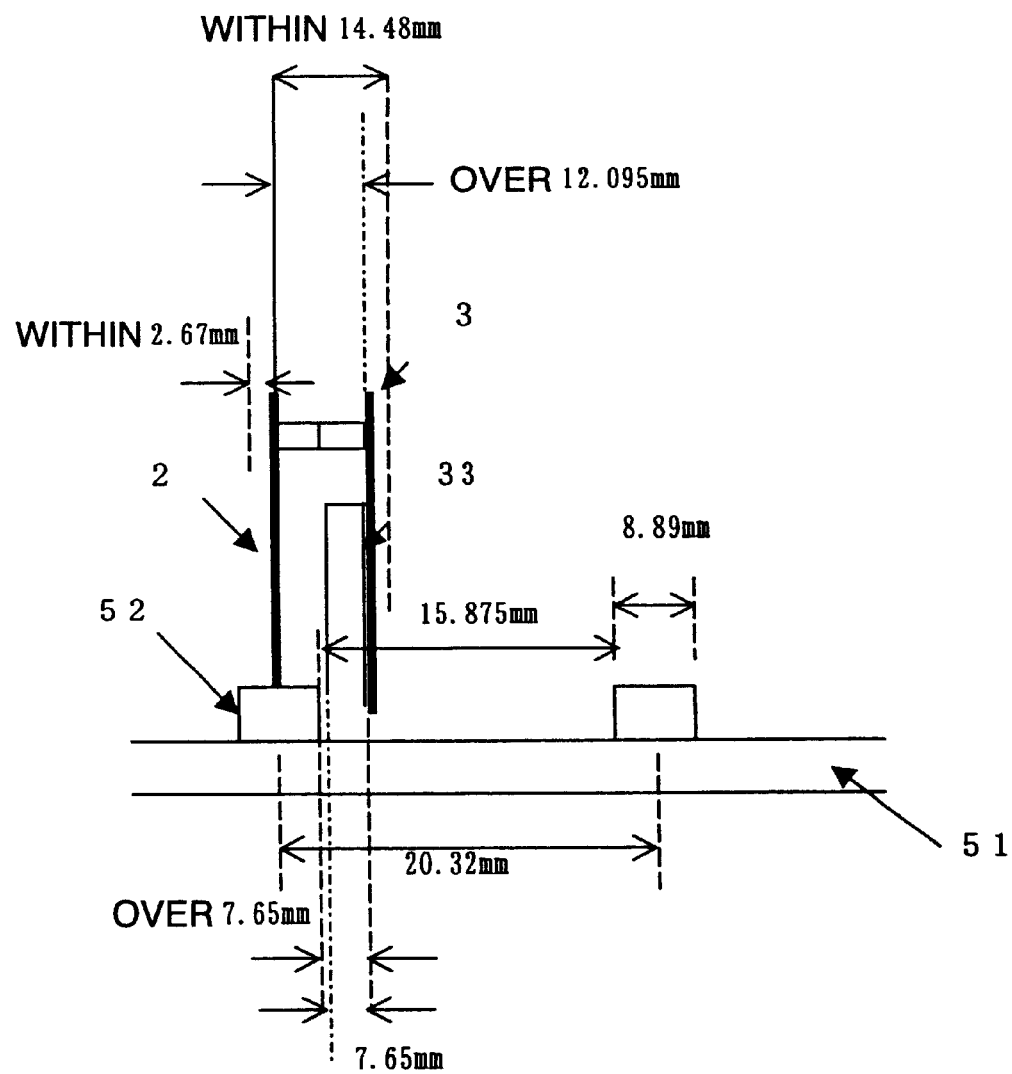
FIG. 9 is a sectional view of an embodiment where the PCI expansion adapter of the present invention is inserted into the PCI expansion connector of the desktop type personal computer.

FIG. 8 shows a front view of the PCI expansion adapter 1 mounted on the PCI expansion connector 52 on the motherboard 51 viewed from the under side of the information processing apparatus in the direction parallel to the motherboard 51. The connection terminal 24 of the low profile PCI expansion board 2 is inserted in PCI expansion connector 52, and the PCI expansion adapter 1 is electrically connected to the motherboard 51.

Dotted lines show outlines of the parts seen through. The "c" direction in FIG. 8 indicates the display side of the information processing apparatus, and the "a" direction indicates the back side of the information processing apparatus. The front side of FIG. 8 indicates the expansion unit 3, and the board behind the expansion unit 3 is the low profile PCI expansion board 2.

Thus, this embodiment adopts a configuration with the insertion/removal opening 224 of the PC card placed on the right side viewed from the display, and therefore the parts mounting plane of the low profile PCI expansion board 2 faces downward.

Furthermore, the PC card slot 33 may be placed on the expansion unit 3 at the left side in FIG. 8, that is, near the insertion/removal opening, or may also be placed at the right side in FIG. 8, that is, distant from the insertion/removal opening.

For the reasons relating to the sizes of the insertion/removal opening and the PC card, the PC card slot 33 is normally placed close to the insertion/removal opening. This is associated with the constraints of the standard of the PC Card Standard Physical Specification.

In the case that a wireless LAN card is used, for example, it may be placed distant from the insertion/removal opening. The wireless LAN card requires an antenna section for wireless communications, and has a shape in which the outline of a normal PC card extends in the longitudinal direction. Therefore, when the wireless LAN card is inserted in the PC card slot 33 placed near the insertion/removal opening, the antenna section bulges considerably from the insertion/removal opening, which not only prevents the cover of the cabinet from closing, but also provides awful looking or collides with other objects to cause breakage, etc. In the case of placing it distant from the insertion/removal opening, it may be also possible to combine it with some ejecting mechanism so as to facilitate the ejection of the PC card of a normal size.

Figure 15:
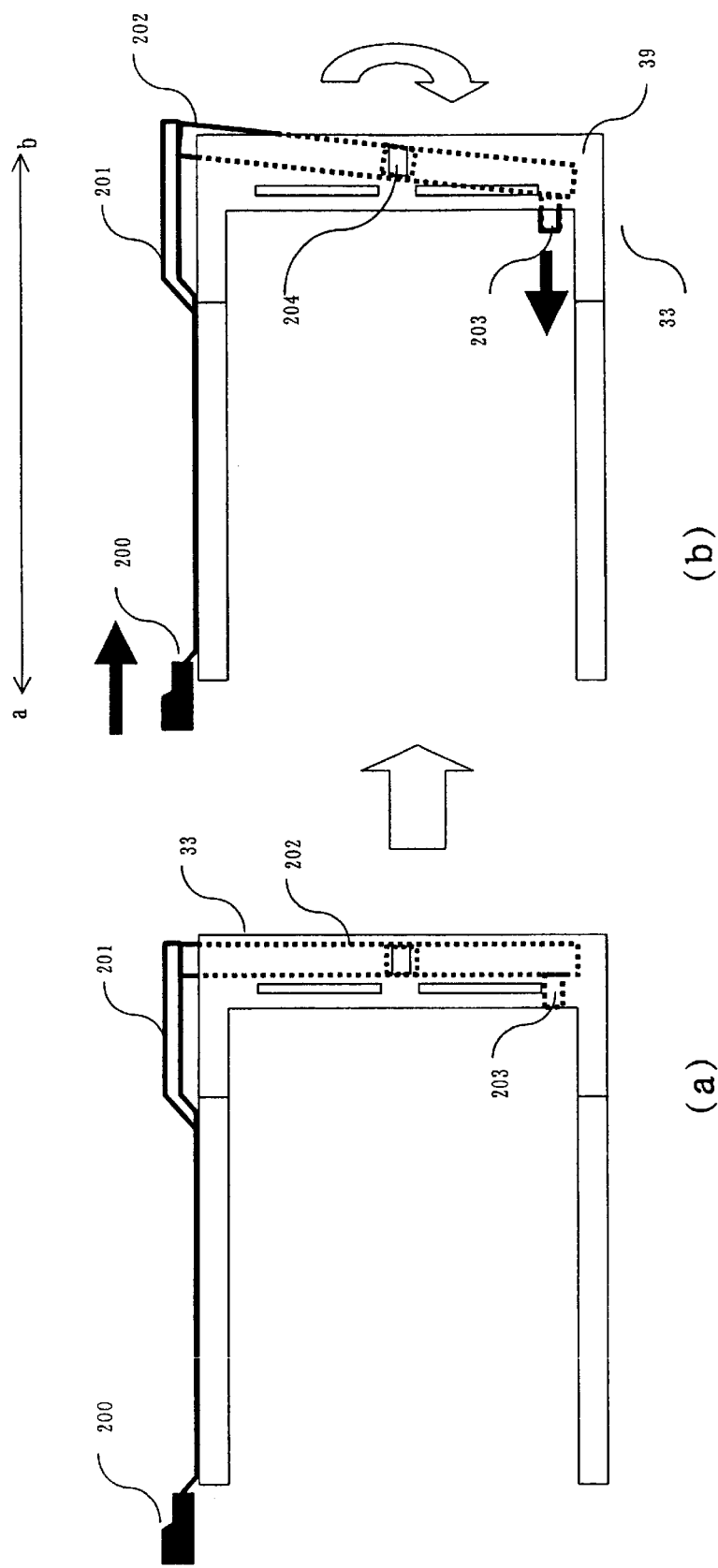
FIG. 15 illustrates an example of a PC card ejecting mechanism.

FIG. 15 shows an example of the ejecting mechanism. FIG. 15(a) shows a state of the ejecting mechanism before pushing an eject button, and FIG. 15(b) shows a state of the ejecting mechanism after pushing the eject button. Dotted lines in FIG. 15 show outlines of parts seen through. The structure is not limited to the one shown in FIG. 15 and can be any structure as far as it allows the PC card to be ejected easily.

The ejecting mechanism in FIG. 15(a) is constructed from the PC card slot 33, an eject button 200 and metal parts 201 to 203. As shown in FIG. 15(b), the connector section 39 of the PC card slot 33 is provided with a protrusion 204, which serves as the fulcrum when the metal part 202 rotates. Furthermore, a depression is provided in the part which contacts the protrusion 204 of the metal part 202 so that the metal part 202 rotates smoothly.

Then, the PC card ejection operation will be explained. First, as shown in FIG. 15(a), the eject button 200 is pushed in the direction indicated by the arrow. The metal part 201 fixed to the eject button 200 is slid along the PC card slot 33 in the ab direction. Furthermore, the metal part 202 fixed to the metal part 201 at one end in such a way that it operates slowly is rotated around the protrusion 204 in the direction indicated by the arrow. The metal part 203 fixed to the other end opposite to the end of the metal part 202 connected to the metal part 201 in such a way that it operates slowly is pushed in the direction indicated by the arrow and physically pushes the PC card.

Furthermore, in the case that the PC card slot 33 is placed distant from the insertion/removal opening and a PC card of a normal size is used, by providing a mechanism which protects the insertion/removal opening, it is possible to prevent the board from being damaged due to dust from the outside.

Figure 16:
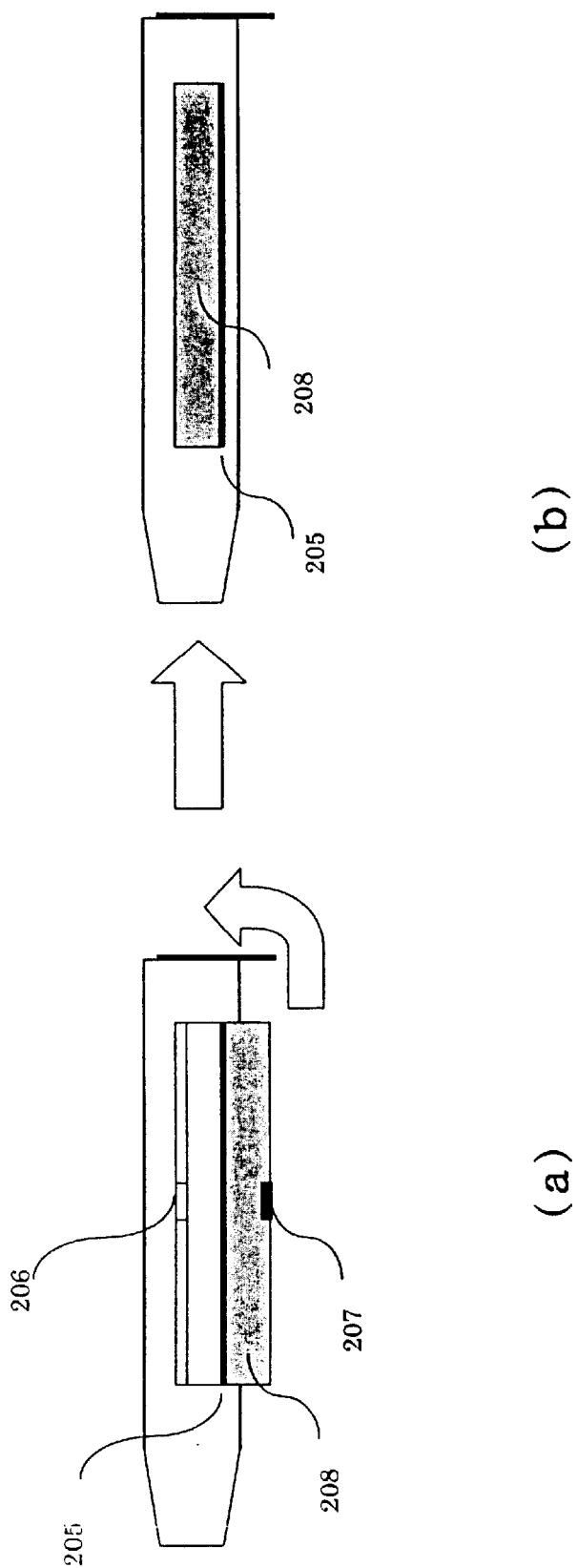
FIG. 16 illustrates an example of a PC card protection cover.

FIG. 16 shows an example of a mechanism of protecting the insertion/removal opening. This mechanism is not limited to that in FIG. 16, while any mechanism can be used, as far as it can protect the insertion/removal opening.

FIG. 16 is constructed from a rotation axis 205, fixing devices 206 and 207, and a protection door 208. FIG. 16(a) shows a state of the mechanism before the door 208 is closed, and FIG. 16(b) shows a state of the insertion/removal opening protected by closing the protection door 208.

As shown FIG. 16(a), the protection door 208 is rotated around the rotation axis 205, whereby the fixing devices 206 and 207 are engaged with each other to fix the protection door 208.

In the case of the configuration in which the insertion/removal opening is provided on the left side viewed from the front of the information processing apparatus, the parts mounting surface of the low profile PCI expansion board faces upward, contrary to the configuration of this embodiment.

The low profile PCI expansion board 2 has external dimensions compliant with the low profile PCI standard. Further, the height of the expansion unit 3 from the motherboard 51 is equal to that of the low profile PCI expansion board 2. However, the height of the expansion unit 3 when connected with the low profile PCI expansion board 2 via the stacking connectors 22 and 32 is not necessarily equal to that of the low profile PCI expansion board 2 but can be lower than that of the low profile PCI expansion board 2.

Thus, there is provided a space between the low profile PCI expansion board 2 and the expansion unit for insertion into the PCI expansion connector 52 on the motherboard 51 so that the PC card slot 33 is placed in this space. Therefore, when the PCI expansion adapter 1 is mounted on the motherboard 51, the PC card slot 33 is placed between the PCI expansion connector 52 and the expansion unit 3 as shown by dotted lines.

Then, the constraints with respect to the width of the PCI expansion adapter 1 of this embodiment and the distance between the low profile PCI expansion board 2 and expansion unit will be explained. The width of the PCI expansion adapter 1 refers to the width H1, for example, in FIG. 4 from the nut 27 of the low profile PCI expansion board 2 to the head of the screw 35 on the expansion unit 3. On the other hand, the distance between the low profile PCI expansion board 2 and expansion unit refers to the distance H2 between the connection terminal 24 on the low profile PCI expansion board 2 and the facing surface of the expansion unit.

The PCI Local Bus Specification Version 2.2 (P.146) defines the width of the PCI expansion connector 52 to be 8.89 mm. Furthermore, when a plurality of PCI expansion connectors 52 are placed in parallel on the motherboard 51, the PCI Local Bus Specification Version 2.2 defines the distance between the neighboring PCI expansion connectors 52 to be 20.32 mm. According to this specification, if the width of the PCI expansion adapter 1 is 20.32−8.89/2= 15.875 mm or less, it is possible to mount a plurality of PCI expansion adapters 1 on the connectors installed on the motherboard 51 at intervals of 23.32 mm.

However, according to the PCI Local Bus Specification Version 2.2 and the ECN concerning and low profile PCI card, there are provided constraints of the mounting of parts, and thus, the width of the PCI expansion adapter 1 is actually 14.48 mm or less. That is, the height from the parts mounting surface of the PCI expansion board 2 to the expansion unit 3 cannot exceed 14.48 mm, due to the constraints according to the standard, as follows.

(1) The height of the rear of the low profile PCI expansion board 2 is 2.67 mm or less.
(2) The height of the parts mounting surface of the low profile PCI expansion board 2 is 14.48 mm or less, The foregoing explanation describes the maximum value of the width of the PCI expansion adapter 1, while the minimum value will be explained below. The distance between the mutually facing surfaces of the low profile PCI expansion board 2 and the expansion unit 3 is half the width of the PCI expansion connector 52, that is, 4.445 mm plus the height of the PC card slot. Since the height of the existing PC card slot used in this embodiment is 7.65 mm, the distance is required to be at least 12.095 (=7.65+4.445) mm. Therefore, the width of the PCI expansion adapter 1 of this embodiment is not less than 12.095 and not more than 14.48 mm. Furthermore, the distance between the low profile PCI expansion board 2 and expansion unit is obtained by subtracting the thickness of the board 21 of the low profile PCI expansion board 2 and the thickness of the board 31 of the expansion unit 3 from the width of this PCI expansion adapter 1. Under these constraints, by reducing the width of the PCI expansion adapter 1, it is possible to reduce the size of the information processing apparatus 51.

Furthermore, in this embodiment, the position of the PC card slot 33 is shifted so that it does not physically interfere with other parts such as the PC card control LSI 23. That is, by mounting a part such as the PC card control LSI whose height is lower than the PC card slot 33 whose height is 7.65 mm while shifting from the PC card slot 33, it is possible to suppress the required distance between the low profile PCI expansion board 2 and the expansion unit 3 to the minimum width of the PCI expansion adapter 1. Furthermore, even when a part higher than the PC card slot 33 is mounted, by shifting its position so that it does not interfere with the PC card slot 33, it is possible to make the distance between the low profile PCI expansion board 2 and the expansion unit 3 within the above-described range.

FIG. 10 is a top view of the configuration in which two PC card slots are placed in parallel viewed from right above the motherboard 51. The thickness of the board 21 of the low profile PCI expansion board 2 and the thickness of the board 31 of the expansion unit are both 1.6 mm, and the distance between the low profile PCI expansion board 2 and the expansion unit 3 when connected via the stacking connectors 22 and 32 is 8 mm. The overall width of the PCI expansion adapter 1 in consideration of screws, etc. is 11.2 mm.

Since the overall width of the PCI expansion adapter 1 is 11.2 mm, even when two or more PCI expansion adapters 1 are connected, the neighboring PCI expansion adapters 1 do not physically interfere with each other, that is, can be mounted in parallel without contacting with each other. Furthermore, in one PCI expansion adapter 1, a part mounted on the low profile PCI expansion board 2 and the expansion unit 3 is placed in such a way that they will not physically interfere with a part mounted on the other board as a connecting object.

However, not only the parts in the configuration adopted in this embodiment, but also any other parts including the PC card control LSI 23 can be mounted arbitrarily, as far as the constraints of the above-described "PCI Local Bus Specification Ver. 2.0" are satisfied. Due to the constraint of the height of the rear of the low profile PCI expansion board 2, the expansion unit 3 must be connected in the current direction, but both the low profile PCI expansion board 2 and expansion unit 3 can mount a part on both surfaces thereof. Furthermore, the PCI expansion adapter 1 can also mount a part such as a PC card slot in the ways shown in FIGS. 11A, 11B and 12.

Figure 11A:
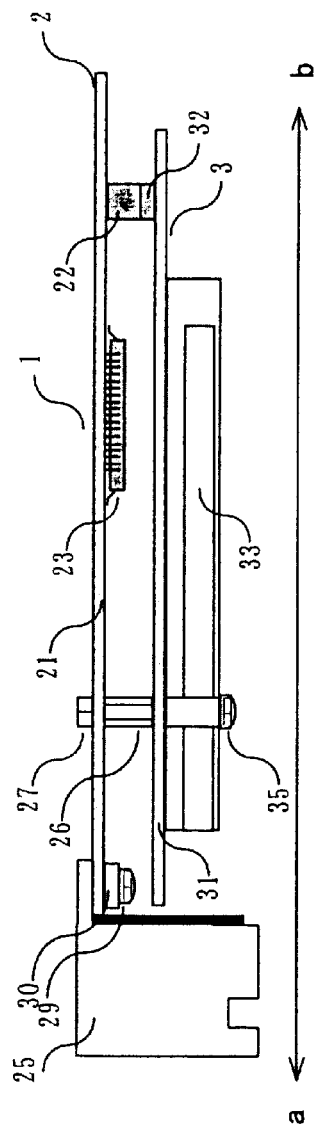
FIGS. 11A and 11B are side views of other embodiments of the PCI expansion adapter of the present invention.
Figure 11B:
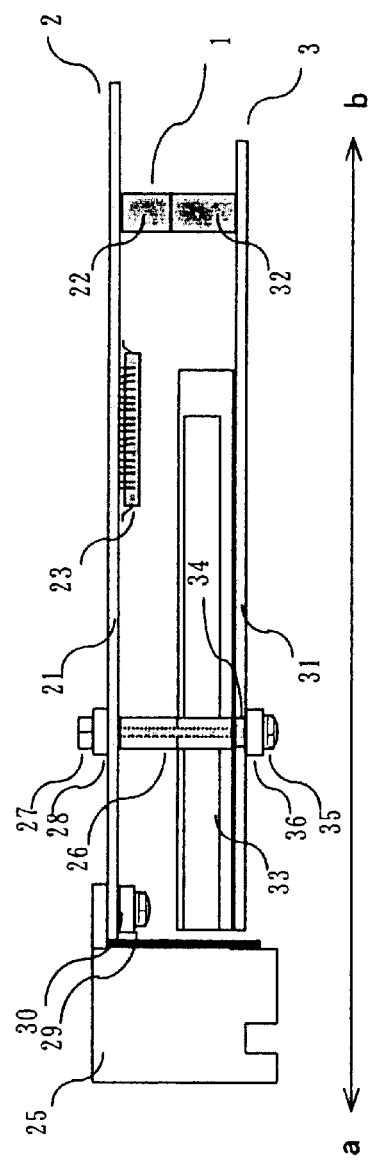
Figure 14:
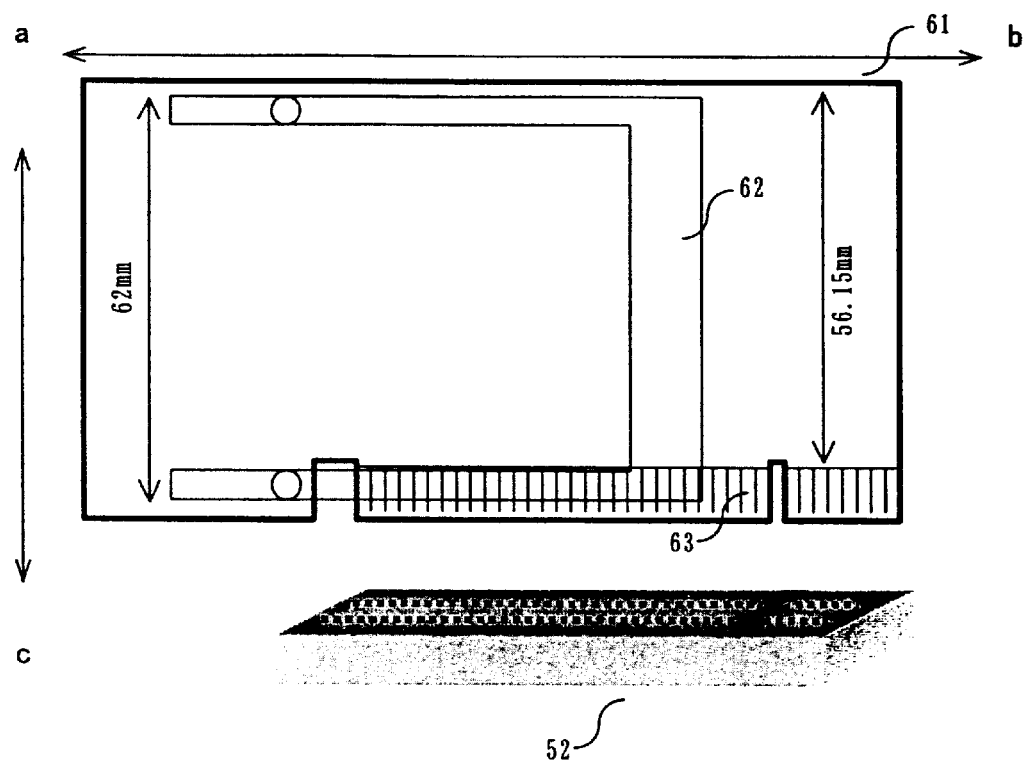
FIG. 14 is an embodiment where the PC card slot is mounted on the low profile PCI expansion board.

In FIG. 11A, the PC card slot 33 is mounted on the surface opposite to the surface on which the stacking connector 32 of the board 21 is mounted. On the other hand, FIG. 11B shows an example where the PC card slot 33 is placed near the insertion/removal opening to facilitate the removal of the PC card from the cabinet. This is the example suited to a case where the PC card does not have a protrusion such as an antenna section of a wireless LAN card.

Furthermore, it is also possible to extend the side in the ab direction of the board 31 of the expansion unit 3 and mount the PC card control LSI 23 on that area of the board 31. This embodiment is effective when there are no structural constraints of the electronic apparatus regarding the length in the ab direction, and further, makes it possible to narrow the width of the PCI expansion adapter 1.

As shown above, a space allowing insertion into the PCI expansion connector is provided between the connection terminal 24 of the low profile PCI expansion board 2 and the expansion unit provided with the PC card slot. By adopting such a configuration that prevents the expansion board from physically interfering with the PCI expansion connector, it is possible to satisfy the low profile PCI expansion board standard and connect a low profile expansion PCI card and the existing PCI expansion slot as well.

Furthermore, the PC card control LSI 23 of the low profile expansion PCI card is placed as close as possible to the connection terminal 24 and stacking connector 22. Such a layout shortens the wiring length between the PC card control LSI 23 and connection terminal 24 and its distance to the stacking connector 22, thus suppressing generation of noise.

As described above, in addition to the low profile PCI expansion board 2, the expansion unit 3 on which a PC card is mounted is provided and a space for insertion into the PCI expansion connector 52 on the motherboard 51 is formed between the low profile PCI expansion board 2 and the expansion unit 3. Thus, the PC card slot 33 is placed between the low profile PCI expansion board 2 and the expansion unit. The above-described configuration satisfies the low profile PCI standard and at the same time allows an existing PC card slot to be mounted on the low profile PCI card of external dimensions compliant with the low profile PCI standard.

Furthermore, by keeping the size of the PCI expansion adapter within the dimensional specification of the low profile PCI expansion board, it is possible to reduce the size of the desktop type personal computer.

Furthermore, by optimizing the layout of parts such as the PC card slot, it is possible to make the PCI expansion adapter smaller and thinner.

Furthermore, by mechanically fixing the low profile PCI expansion board and the expansion unit which constitute the PCI expansion adapter by using the board fixing structure of the PC card slot, the structure can be strengthened.

Furthermore, by placing the PC card control LSI near the means for electrical connection with the PCI bus and shortening the wiring length between the PCI bus and PC card control LSI, the generation of noise can be suppressed.

Then, the mechanism of dissipating static electricity from the PCI expansion adapter 1 of the above-described embodiment will be explained using FIG. 13 and FIG. 7. The bracket 25, the spacer 26, the screw 35, the screw 29, the washer 30 and the metal part 40 are electrically conductive parts. The metal part 40 on the PC card slot 33 shown in FIG. 7 has a structure whereby the metal part 40 physically contacts the PC card and also electrically connects with the screw 35 through the board fixing screw hole 37. Furthermore, the screw 35 and spacer 26 are electrically connected with a pad with a solid pattern on the board 21. Furthermore, the bracket 25 is electrically connected with the solid pattern on the board 21 through another pad via the screw 29 and the washer 30.

Therefore, as shown by the arrow in FIG. 13, the static electricity charged on the PC card flows into the cabinet ground through the path formed by the metal part 40, screw 35, spacer 26, solid pattern on the board 21 and bracket 25. The above-described configuration can provide an anti-static-noise measure for a PC card on the expansion unit, which has no direct contact with the cabinet.

As explained above, the present invention allows an existing PC card slot to be used to expand a PC card on an electronic apparatus using a PCI expansion adapter of external dimensions compliant with the low profile PCI standard.

What is claimed is:

1. An electronic apparatus to which a PC card can be mounted, comprising:
   a first board provided with a bus used for transmitting data in the electronic apparatus and an expansion connector connected with the bus;
   a second PCI-compliant low profile board provided with a connection terminal to be inserted into the expansion connector;
   an expansion unit provided with a PC card slot for accepting the PC card, which is placed in parallel to the second board; and
   an expansion unit connector for connecting the expansion unit to the second board.

2. An electronic apparatus according to claim 1, wherein the expansion unit comprises a third board on which the PC card slot is mounted.

3. An electronic apparatus according to claim 1, wherein the height of the second board, in which a first edge provided with the connection terminal is regarded as a base side, is equal to or greater than the length of the expansion unit in the same direction.

4. An electronic apparatus according to claim 1, wherein
the distance between a part provided with the connection terminal on a first surface of the second board facing the expansion unit and a second surface of the expansion unit facing the second board is 4.45 mm or more,
the height of a highest part on a third surface of the second board opposite to the first surface is 2.67 mm or less from the third surface, and
the height of a highest part on a fourth surface of the expansion unit opposite to the second surface is 14.48 mm or less from the first surface of the second board.

5. An electronic apparatus according to claim 1, further comprising a cabinet for accommodating the first and second boards and the expansion unit therein, wherein the PC card slot is provided with an eject button for ejecting the PC card inserted in the expansion unit.

6. An electronic apparatus according to claim 1, further comprising a cabinet for accommodating the first and second boards and the expansion unit therein, wherein the cabinet is provided with a cover for covering the PC card insertion/removal opening.

7. An electronic apparatus in which a PC card is used, comprising:
a PCI expansion adapter on which a PC card is mounted;
a first board provided with a PCI expansion connector for mounting the PCI expansion adapter thereon;
a cabinet provided with a PC card insertion/removal opening; and
a fixing member for fixing the PCI expansion adapter to the cabinet, wherein
the PCI expansion adapter comprises:
a second PCI-compliant low profile board provided, at one edge thereof, with a connection terminal to be inserted into the PCI expansion connector;
an expansion unit provided with a PC card slot; and
a connection member for transmitting a signal between the second board and the expansion unit, and wherein
the inserting/removing direction of the PC card with respect to the PC card insertion/removal opening is the same as that of said edge provided with the connection terminal of the second board.

8. An electronic apparatus according to claim 7, wherein the expansion unit comprises a third board on which the PC card slot is mounted.

9. An electronic apparatus according to claim 7, wherein the length in the height direction of the second board, in which an edge provided with the connection terminal is regarded as a base side, is equal to or greater than the length of the expansion unit in the same direction.

10. An electronic apparatus according to claim 7, wherein the cabinet is provided with a cover for covering the insertion/removal opening.

11. An electronic apparatus according to claim 7, further comprising a mechanism for securing and removing a PC card.

12. An electronic apparatus according to claim 11, wherein the mechanism for securing and removing a PC card includes a PC card ejection button provided on the cabinet.

13. An electronic apparatus according to claim 7, wherein
the distance between a part provided with the connection terminal on a first surface of the second hoard facing the expansion unit and a second surface of the expansion unit facing the second board is 4.45 mm or more,
the height of a highest part on a third surface of the second board opposite to the first surface is 2.67 mm or less from the third surface, and
the height of a highest part on a fourth surface of the expansion unit opposite to the second surface is 14.48 mm or less from the first surface of the second board.

14. An electronic apparatus provided with a PC card slot, comprising:
a motherboard provided with a PCI bus expansion connector;
low profile PCI-compliant expansion card provided with a connection terminal connected to the PCI bus expansion connector,
an expansion unit provided with the PC card slot;
an expansion unit connector for connecting the expansion card with the expansion unit; and
a cabinet provided with an insertion/removal opening for inserting/removing the PC card, wherein
the distance from a surface of the expansion card provided with the connection terminal to the expansion unit is 4.45 mm or more.

15. An electronic apparatus according to claim 14, wherein the expansion unit includes a PC card slot mounting board for mounting the PC card slot thereon, and the PC card slot is placed between the connection terminal on the expansion card, and the PC card slot mounting board.

16. An electronic apparatus according to claim 14, wherein
the expansion unit connector comprises a first connector provided on the expansion card and a second connector provided on a PC card slot mounting board,
the second connector is provided at the other end opposite to an end facing the insertion/removal opening on the PC card slot mounting board, and
the first connector is provided at a position facing the second connector on the expansion card.

17. An electronic apparatus according to claim 14, wherein the cabinet is provided with a cover for covering the insertion/removal opening.

18. An electronic apparatus according to claim 14, further comprising a mechanism for securing and removing a PC card.

* * * * *